United States Patent
Hirai (10) Patent No.: US 10,438,333 B2
(45) Date of Patent: Oct. 8, 2019

(54) APPARATUS, METHOD, AND NON-TRANSITORY COMPUTER-READABLE STORAGE MEDIUM

(71) Applicant: FUJITSU LIMITED, Kawasaki-shi, Kanagawa (JP)

(72) Inventor: Yukio Hirai, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 15/693,712

(22) Filed: Sep. 1, 2017

(65) Prior Publication Data
US 2018/0089810 A1  Mar. 29, 2018

(30) Foreign Application Priority Data
Sep. 27, 2016  (JP) ................ 2016-188839

(51) Int. Cl.
*G06T 5/00* (2006.01)
*G06T 5/40* (2006.01)
*G06T 11/60* (2006.01)

(52) U.S. Cl.
CPC .............. *G06T 5/009* (2013.01); *G06T 5/007* (2013.01); *G06T 5/40* (2013.01); *G06T 11/60* (2013.01); *G06T 2207/10024* (2013.01); *G06T 2207/20016* (2013.01); *G06T 2207/20224* (2013.01)

(58) Field of Classification Search
CPC ......... G06T 5/009; G06T 5/007; G06T 11/60; G06T 5/40; G06T 2207/20016; G06T 2207/20224; G06T 2207/10024
See application file for complete search history.

(56) References Cited

U.S. PATENT DOCUMENTS

| | | | |
|---|---|---|---|
| 2006/0056688 A1* | 3/2006 | Toyoda | G06T 5/009 382/169 |
| 2008/0101719 A1* | 5/2008 | Lim | H04N 1/4072 382/274 |
| 2009/0002562 A1* | 1/2009 | Yokoyama | G06T 5/009 348/673 |

(Continued)

FOREIGN PATENT DOCUMENTS

| | | |
|---|---|---|
| EP | 0 468 730 A2 | 1/1992 |
| JP | 4-78969 | 3/1992 |

(Continued)

OTHER PUBLICATIONS

Jobson et al., "Properties and Performance of a Center/Surround Retinex," IEEE Transaction on Image Processing, vol. 6, No. 3, Mar. 1997, pp. 451-462.

*Primary Examiner* — Yon J Couso
(74) *Attorney, Agent, or Firm* — Staas & Halsey LLP (57) ABSTRACT

An apparatus for image correction is configured to execute a second image generation process that includes execution of a process for emphasizing a contrast for a first image to generate a second image, execute a ratio calculation process that includes calculation, based on a relation between a frequency distribution of at least one of a luminance value, an edge strength and a color component in the first image or the second image and a value of the at least one for each pixel, of a synthesis ratio of the first image to the second image for the pixel, and execute a synthesis process that includes synthesis of the first image and the second image based on the synthesis ratio for each pixel.

8 Claims, 8 Drawing Sheets

(56) References Cited

U.S. PATENT DOCUMENTS

2012/0026317 A1\* 2/2012 Nakahira ............... H04N 7/183
348/92
2015/0326752 A1 11/2015 Hayasaki
2016/0260199 A1\* 9/2016 Takahama ............ G06K 9/4661

FOREIGN PATENT DOCUMENTS

| | | |
|---|---|---|
| JP | 2005-51379 | 2/2005 |
| JP | 2005-339076 | 12/2005 |
| JP | 2014-10576 | 1/2014 |

\* cited by examiner

APPARATUS, METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-188839, filed on 27 Sep. 2016, the entire contents of which are incorporated herein by reference.

FIELD

The embodiment discussed herein is related to an apparatus, a method and a non-transitory computer-readable storage medium for an image correction process by which, for example, the contrast of an image pickup object reflected in an image is corrected.

BACKGROUND

When an image of an image pickup object is picked up, while a portion of the image pickup object is illuminated, another portion of the image pickup object is in a shadow. In such a case, a picked up image sometimes exhibits an excessively great difference between the luminance of the illuminated portion and the luminance of the shadowed portion of the image pickup object, resulting in difficulty in discrimination of one of the portions. Therefore, a technology has been proposed which may improve the contrast of an image pickup object by compressing the dynamic range in accordance with the Retinex theory.

The Retinex theory is based on the assumption that the visual system of the human being perceives objects based on a distribution in reflectance of an object surface with the illuminance distribution of illumination light removed from the distribution of reflected light from the object rather than based on the distribution of the reflected light. Therefore, according to the Retinex theory, where the luminance value of a pixel (x,y) of an original image is represented by I(x,y), the reflectance of an image pickup object reflected on the pixel (x,y) of the original image is represented by R(x,y) and the illuminance of illumination light at the pixel (x,y) is represented by L(x,y), it is assumed that the following expression is satisfied:

$$I(x,y)=R(x,y)L(x,y).$$

Here, as a distribution L of the illuminance of illumination light, for example, a smoothened image is used which is obtained by applying a low pass filter such as a Gaussian filter to the original image. Then, an arithmetic operation of, for example, R(x,y)=I(x,y)/L(x,y) is performed to determine the reflectance R(x,y) of each pixel, and the reflectance R(x,y) of each pixel is multiplied by a constant k (where k>1) to obtain a corrected image.

However, an original image sometimes includes a background region having a very low luminance value. Since, in such a background region as just described, the ratio of noise components to a signal component is relatively high, the background region sometimes includes some spatial fluctuation in luminance value caused by the noise components. Therefore, if such a process for contrast improvement as descried above is applied to an original image, the luminance of each pixel in the background region becomes relatively high and the spatial fluctuation in luminance value caused by noise in the background region is sometimes emphasized. On the other hand, another technology has been proposed by which, in order to reduce noise included in an image, a difference value between a plurality of smoothened images and an input image is determined and compared with a threshold value to perform selection of smoothened pixels or input pixels or comparison of pixels of lower smoothness is performed (for example, refer to the patent document mentioned below).

Examples of the related art include Japanese Laid-open Patent Publication No. 2005-51379, and a non-patent document (D. J. Jobson et al., "*Properties and Performance of a Center/Surround Retinex*," IEEE Trans. On Image Processing, Vol. 6, No. 3, March, 1997).

SUMMARY

According to an aspect of the embodiment, an apparatus for image correction includes: a memory; and a processor coupled to the memory and configured to execute a second image generation process that includes execution of a process for emphasizing a contrast for a first image to generate a second image, execute a ratio calculation process that includes calculation, based on a relation between a frequency distribution of at least one of a luminance value, an edge strength and a color component in the first image or the second image and a value of the at least one for each pixel, of a synthesis ratio of the first image to the second image for the pixel, and execute a synthesis process that includes synthesis of the first image and the second image based on the synthesis ratio for each pixel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

According to the technology relating to noise reduction described above, the contrast is not improved. In order to improve the contrast of an original image, such a process for contrast improvement as described above is applied to an original image. If the technology relating to noise reduction described above is applied to an image for which such a process for contrast improvement has been performed, although the fluctuation caused by noise in a background region may be reduced, the background region in most cases becomes bright in comparison with the original image.

As one aspect of the present embodiment, provided are techniques for being able to suitably emphasize the contrast of an image pickup object while emphasis of the luminance and noise of a background region is suppressed.

In the following, an image correction apparatus is described with reference to the drawings. The image correction apparatus suppresses emphasis of noise and luminance in a background region by making it possible to obtain, in a region of an image in which an image pickup object is reflected, an effect of local luminance correction such as contrast emphasis and suppressing, in a background region of the image, the effect of local luminance correction.

The inventor has found that a background region has the following characteristics. For example, (1) the background region is low in luminance value and besides includes many pixels having luminance values of similar levels to each other. (2) The background region is low in edge strength between neighboring pixels and besides includes many pixels having edge strengths of similar levels to each other. (3) The color tone does not vary very much over the entire background region. Therefore, the present image correction apparatus generates an emphasized contrast image by applying a contrast emphasis process to an original image and synthesizes the original image and the emphasized contrast image to generate a corrected luminance image. Then, the image correction apparatus calculates, for each pixel, a synthesis ratio when the original image and the emphasized contrast image are synthesized and sets the synthesis ratio such that, for a pixel having such a characteristic of the background region as described above, the synthesis ratio of the original image to the emphasized contrast image is high.

Figure 1:
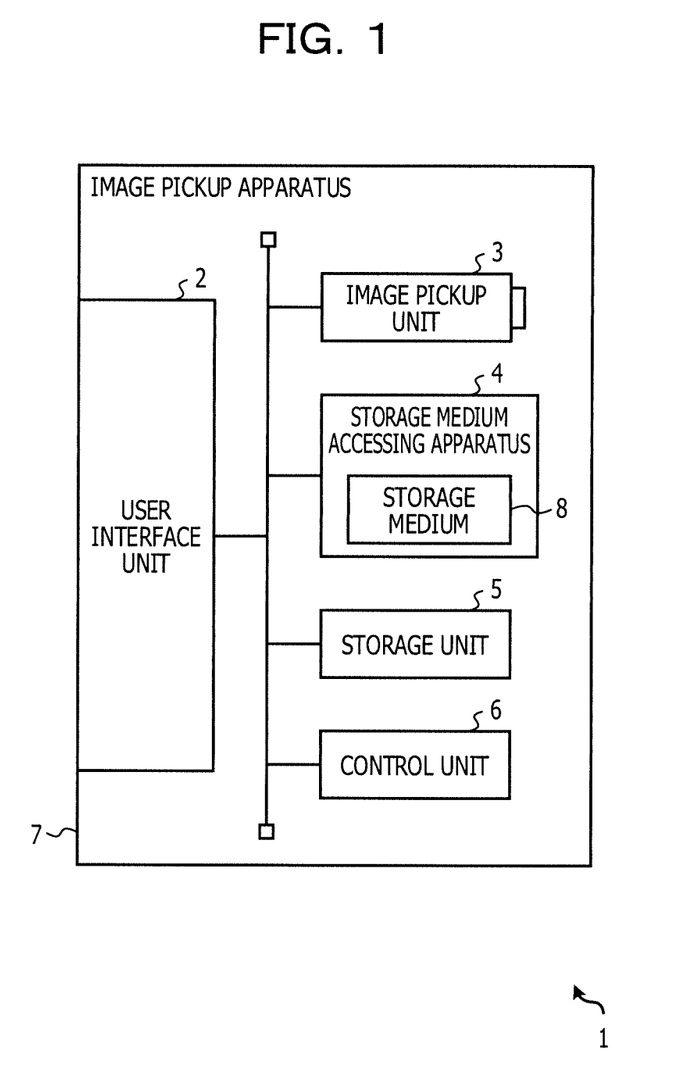
FIG. 1 is a hardware configuration diagram of an image pickup apparatus in which an image correction apparatus according to an embodiment is incorporated.

FIG. 1 is a hardware configuration diagram of an image pickup apparatus in which an image correction apparatus according to an embodiment is incorporated. The image pickup apparatus 1 includes a user interface unit 2, an image pickup unit 3, a storage medium accessing apparatus 4, a storage unit 5, and a control unit 6. The user interface unit 2, the image pickup unit 3, the storage medium accessing apparatus 4, the storage unit 5, and the control unit 6 are disposed in a housing 7. It is to be noted that the image pickup apparatus 1 is, for example, a portable telephone set, a portable information terminal, a digital camera or a tablet type computer. Further, the image pickup apparatus 1 may include a communication interface circuit (not depicted) for coupling the image pickup apparatus 1 to another apparatus. It is to be noted that FIG. 1 is a view depicting components the image pickup apparatus 1 includes but is not a view indicating actual disposition of each component of the image pickup apparatus 1.

The user interface unit 2 includes, for example, a liquid crystal display unit or an organic electroluminescence display unit and is disposed such that the display screen of the user interface unit 2 is directed to a user who opposes the front face of the housing 7. The user interface unit 2 displays various kinds of information such as an image generated by the image pickup unit 3 to the user. Further, the user interface unit 2 may include a plurality of operation buttons for allowing the user to perform an operation for the image pickup apparatus 1. Alternatively, the user interface unit 2 may include a touch panel display unit. In this case, the user interface unit 2 displays, for example, various icons or operation buttons in response to a control signal from the control unit 6. Then, when the user touches a position of a displayed icon or a displayed operation button, the user interface unit 2 generates an operation signal corresponding to the position and outputs the operation signal to the control unit 6.

The image pickup unit 3 includes an image sensor including solid state image pickup elements disposed, for example, in a two-dimensional array, and an image pickup optical system for forming an image of an image pickup object on the image sensor.

The image pickup unit 3 generates an image on which an image pickup object is reflected by imaging the image pickup object in response to an operation of the user. In the present embodiment, the image pickup unit 3 generates a color image represented by the RGB (red, green, and blue) color system. Every time an image is generated, the image pickup unit 3 outputs the generated image to the control unit 6.

The storage medium accessing apparatus 4 is an apparatus that accesses a storage medium 8 such as a semiconductor memory card. The storage medium accessing apparatus 4 reads a computer program stored, for example, in the storage medium 8 and to be executed by the control unit 6 and passes the computer program to the control unit 6. Further, as hereinafter described, when the control unit 6 executes a computer program that implements a function as an image correction apparatus, the storage medium accessing apparatus 4 may read a computer program for image correction from the storage medium 8 and pass the computer program to the control unit 6.

The storage unit 5 includes, for example, a readable and writable nonvolatile semiconductor memory and a readable and writable volatile semiconductor memory. The storage unit 5 stores various application programs to be executed by the control unit 6 and various kinds of data. Further, the storage unit 5 stores an image that is a target of an image correction process, a corrected image generated by execution of the image correction process, various kinds of data used for the image correction process or various kinds of data generated in the middle of the image correction process.

The control unit 6 includes one or a plurality of processors and peripheral circuits thereof. The control unit 6 is coupled to the components of the image pickup apparatus 1 through signal lines and controls the entire image pickup apparatus 1.

Further, the control unit 6 acts as an image correction apparatus and executes an image correction process for an image received from the image pickup unit 3.

Figure 2:
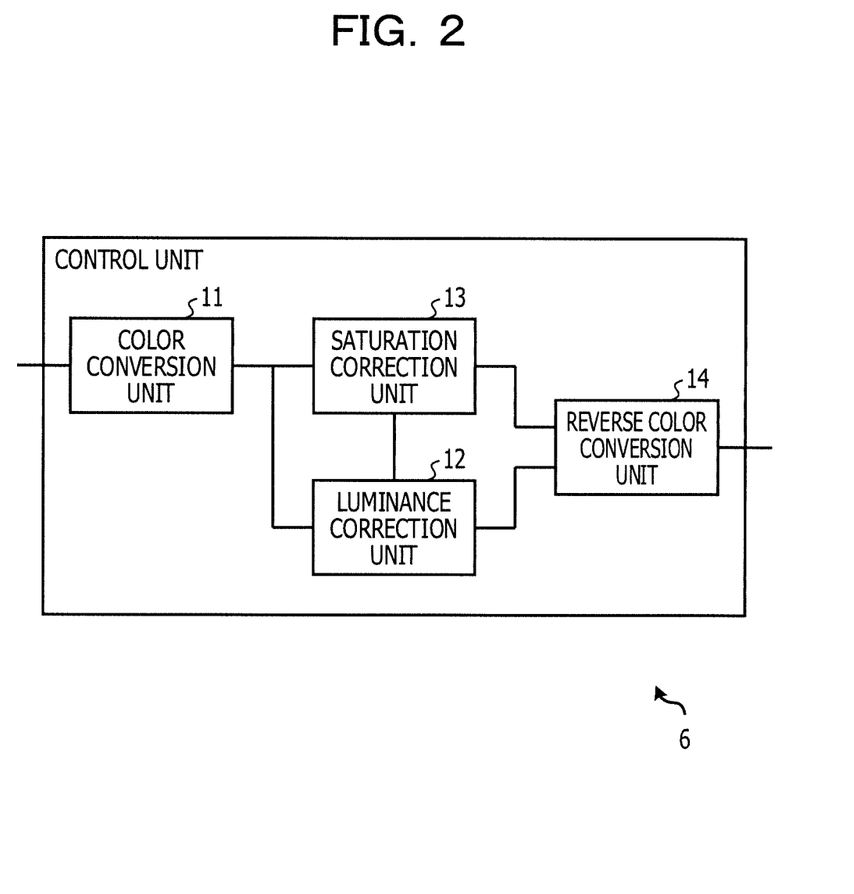
FIG. 2 is a functional block diagram of a control unit relating to an image correction process.

FIG. 2 is a functional block diagram of a control unit relating to an image correction process. The control unit depicted in FIG. 2 may be the control unit 6 depicted in FIG. 1. The control unit 6 includes a color conversion unit 11, a luminance correction unit 12, a saturation correction unit 13 and a reverse color conversion unit 14. The components of the control unit 6 are each implemented, for example, by a computer program executed by the control unit 6. It is to be noted that each of the components of the control unit 6 may be incorporated in the image pickup apparatus 1 as one or a plurality of integrated circuits that implement the function of the component separately from the processor of the control unit 6.

It is to be noted that, in the following description, an image that is a target of the image correction process is referred to as original image.

The color conversion unit 11 converts each pixel of an original image from values represented by the RGB color system into values represented by the YUV color system. Then, the color conversion unit 11 outputs a luminance image, in which each pixel has only a luminance component (for example, a Y component), to the luminance correction unit 12, and outputs a color difference image, in which each pixel has only color difference components (for example, a U component and a V component), to the luminance correction unit 12 and the saturation correction unit 13.

The luminance correction unit 12 corrects the luminance value of each pixel of the luminance image such that the contrast of an image pickup object is emphasized to generate a corrected luminance image. Then, the luminance correction unit 12 outputs the corrected luminance image to the reverse color conversion unit 14. Furthermore, the luminance correction unit 12 outputs to the saturation correction unit 13, for each pixel of the corrected luminance image, a luminance correction coefficient r which is a ratio of the luminance value after correction to the luminance value of a corresponding pixel of the luminance image before correction. It is to be noted that details of the process of the luminance correction unit 12 are hereinafter described.

The saturation correction unit 13 corrects color difference components of each pixel of the image in response to the luminance correction coefficient r of the same pixel. For example, the saturation correction unit 13 corrects color difference components of each pixel of the image in accordance with the following expressions (1):

$$U'=\alpha(r)(U-\beta)+\beta$$

$$V'=\alpha(r)(V-\beta)+\beta \quad (1)$$

where U and V are values of U and V components before correction, respectively, and U' and V' are values of U and V components after correction, respectively. $\beta$ is a constant and is set to 128 where the U and V components are represented by 0 to 255, for example. Further, $\alpha(r)$ is a correction coefficient set in response to the luminance correction coefficient r and may be, for example, a linear monotonically increasing function with an increasing luminance correction coefficient r or a monotonically increasing function in which the increase rate becomes moderate as the luminance correction coefficient r increases like a sigmoid function.

The saturation correction unit 13 outputs the corrected values of each pixel of the color difference image to the reverse color conversion unit 14.

The reverse color conversion unit 14 converts each pixel of the corrected luminance image from values of the YUV color system, which are represented by the luminance value of the pixel and color difference components of a corresponding pixel of the corrected color difference image into values represented by the RGB color system. By the conversion, a corrected image is obtained.

In the following, details of a luminance correction unit are described.

Figure 3:
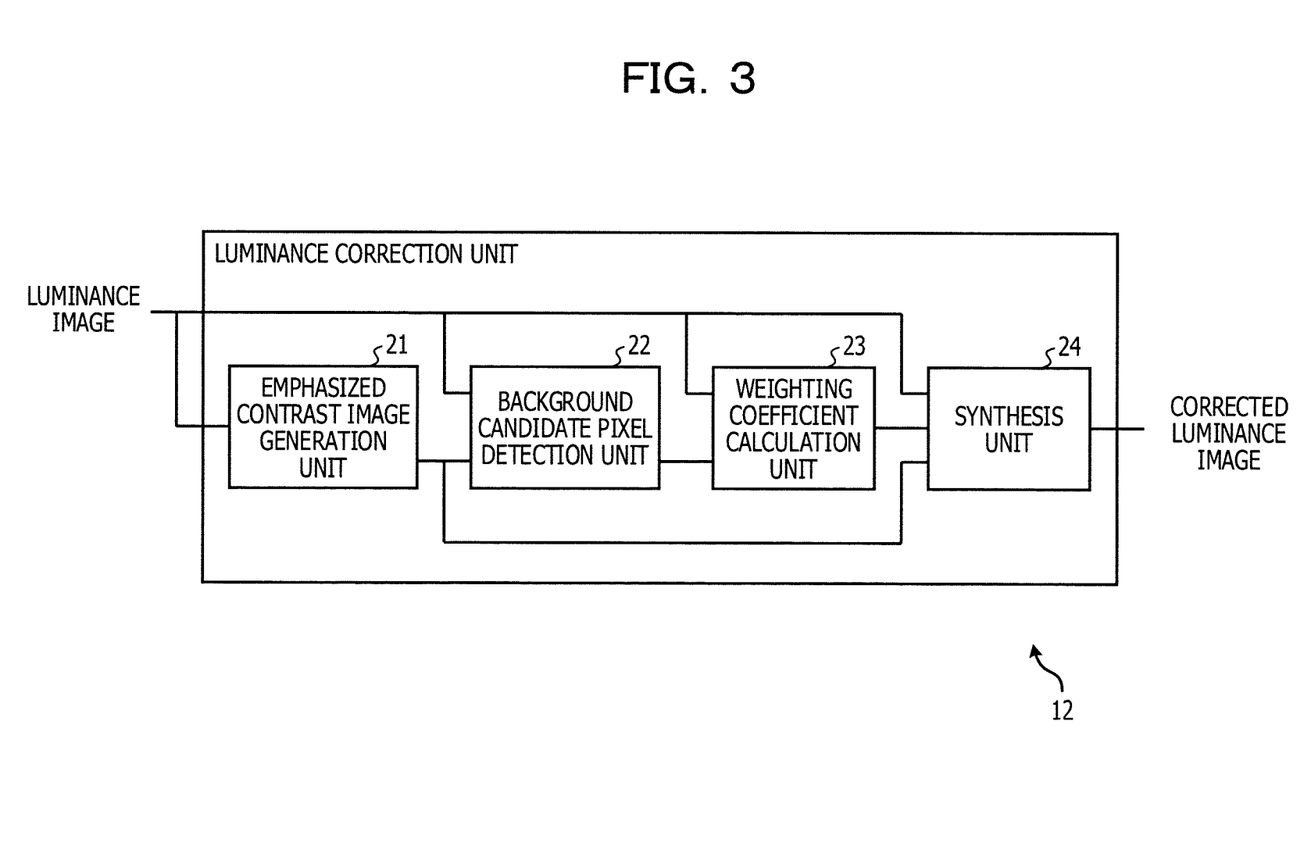
FIG. 3 is a functional block diagram of a luminance correction unit.

FIG. 3 is a functional block diagram of a luminance correction unit. The luminance correction unit depicted in FIG. 3 may be the luminance correction unit 12 depicted in FIG. 2. The luminance correction unit 12 includes an emphasized contrast image generation unit 21, a background candidate pixel detection unit 22, a weighting coefficient calculation unit 23 and a synthesis unit 24.

The emphasized contrast image generation unit 21 performs, for a luminance image, a contrast emphasis process for emphasizing the contrast of an image pickup object reflected in the luminance image to generate an emphasized contrast image. For example, the emphasized contrast image generation unit 21 may apply a process based on the Retinex theory as the contrast emphasis process. It is to be noted that the emphasized contrast image generation unit 21 may apply to the luminance image some other contrast emphasis process (for example, a histogram flattening method) by which an edge on a luminance image arising from a structure of an image pickup object is emphasized.

The emphasized contrast image generation unit 21 outputs the generated emphasized contrast image to the background candidate pixel detection unit 22 and the synthesis unit 24.

The background candidate pixel detection unit 22 detects a pixel that may possibly be included in a background region of the luminance image as a background candidate pixel.

In the contrast emphasis process, the contrast is more likely to be emphasized in a region in which the luminance value is relatively low. Therefore, in the present embodiment, the background candidate pixel detection unit 22 calculates, for each of the luminance image and the emphasized contrast image, an edge strength for each pixel. Then, the background candidate pixel detection unit 22 detects, as a background candidate pixel, any pixel with regard to which the difference between the edge strength in the emphasized contrast image and the edge strength in the luminance image is equal to or greater than a threshold value. By this detection, the background candidate pixel detection unit 22 may detect a pixel included in the background region with a high degree of accuracy as a background candidate pixel.

Figure 4:
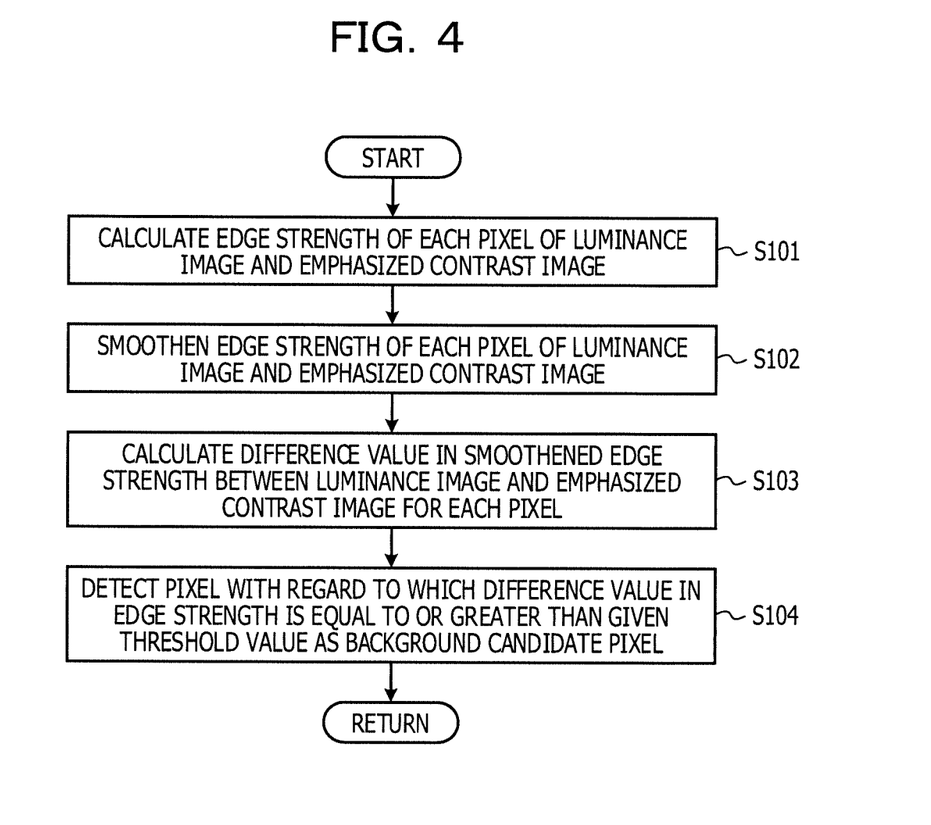
FIG. 4 is a flow chart of action for a background candidate pixel detection process according to an example.

FIG. 4 is a flow chart of action for a background candidate pixel detection process according to an example.

The background candidate pixel detection unit 22 calculates, individually for a luminance image and an emphasized contrast image, an edge strength for each pixel (step S101). For example, the background candidate pixel detection unit 22 calculates an absolute value of a value obtained by executing a Laplacian filter process as an edge strength. Alternatively, the background candidate pixel detection unit 22 may apply, in place of the Laplacian filter process, a primary differential filter in both a horizontal direction and a vertical direction, calculate an edge strength in the horizontal direction and an edge strength in the vertical direction, and determine the sum of squares of the edge strengths as an edge strength. It is to be noted that the background candidate pixel detection unit 22 may use, for example, a sobel filter or a prewitt filter as the primary differential filter.

The background candidate pixel detection unit 22 executes, individually for the luminance image and the emphasized contrast image, a low pass filter process for the edge strength obtained for each pixel to perform smoothing (step S102). The background candidate pixel detection unit 22 applies, for example, a Gaussian filter as the low pass filter. Alternatively, the background candidate pixel detection unit 22 may execute, in place of the Gaussian filter, an expansion and contraction arithmetic operation of morphology or a simple averaging process of a given window size.

The background candidate pixel detection unit 22 subtracts, for each pixel of the emphasized contrast image, a smoothened edge strength of the corresponding pixel of the luminance image from a smoothened edge strength of the pixel to calculate a difference value in edge strength (step S103). Then, the background candidate pixel detection unit 22 compares, for each pixel of the emphasized contrast image, the difference value in edge strength with a given threshold value (for example, 10 to 20). The background candidate pixel detection unit 22 detects, from among the pixels of the original image or the emphasized contrast image, the pixels with regard to which the difference value in edge strength is equal to or greater than the given threshold value as background candidate pixels (step S104).

The background candidate pixel detection unit 22 notifies the weighting coefficient calculation unit 23 of the detected background candidate pixels.

The weighting coefficient calculation unit 23 is an example of a synthesis ratio calculation unit and calculates, for each pixel, a weighting coefficient for synthesizing the emphasized contrast image and the luminance image.

In the present embodiment, the weighting coefficient calculation unit 23 calculates, for the set of background candidate pixels, a histogram of luminance, a histogram of edge strength and a histogram of color difference component based on the luminance image. Then, the weighting coefficient calculation unit 23 calculates a weighting coefficient of the luminance image with respect to the emphasized contrast image based on a relation between the histograms and the luminance, edge strength and color difference component of each background candidate pixel. Thereupon, the weighting coefficient calculation unit 23 calculates the weighting coefficient for each pixel such that a pixel having a characteristic closer to a characteristic of the background region of the original image in regard to the luminance value, edge strength and color difference component is synthesized with a higher synthesis ratio of the luminance image to the emphasized contrast image. Consequently, the emphasis in noise and luminance in the background region may be suppressed.

Figures 5A, 5C:
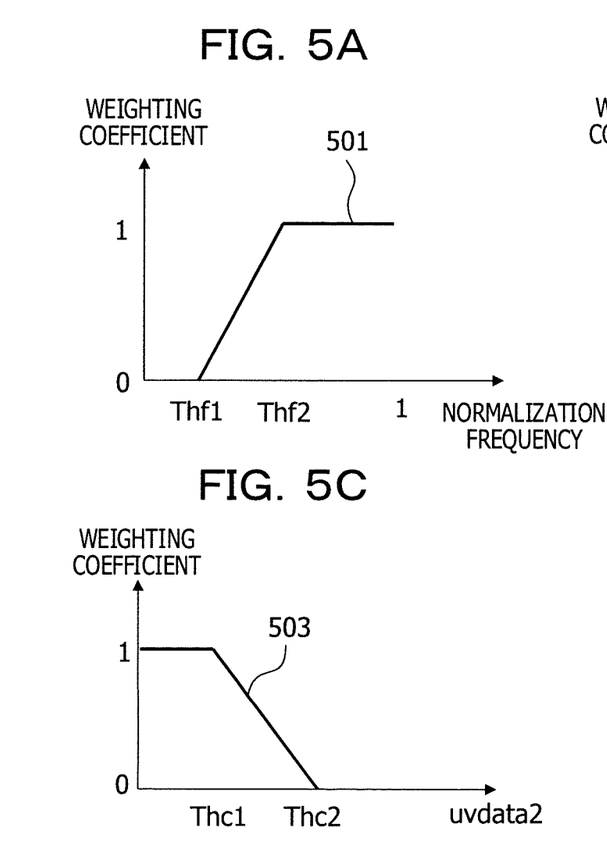
FIGS. 5A to 5C are views illustrating an example of relations between a histogram of a luminance, a histogram of an edge strength and a histogram of a color difference component and a weighting coefficient with regard to a set of background candidate pixels, respectively.
Figure 5B:
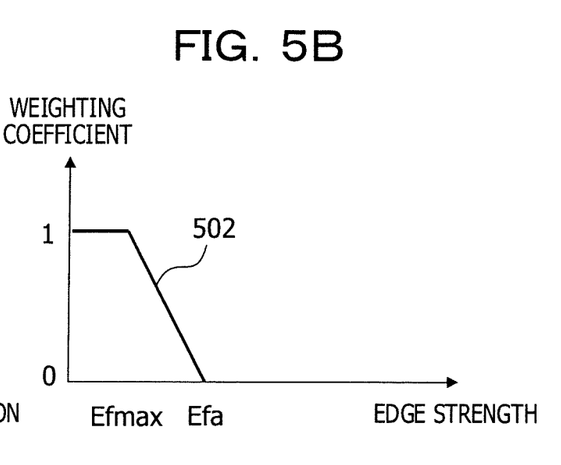

FIGS. 5A to 5C are views illustrating an example of relations between a histogram of a luminance, a histogram of an edge strength and a histogram of a color difference component and a weighting coefficient with regard to a set of background candidate pixels, respectively. For example, the weighting coefficient calculation unit 23 calculates the weighting coefficient for each background candidate pixel in accordance with the relations between the respective histograms regarding the luminance, edge strength and color difference component and the weighting coefficient for the luminance image depicted in FIGS. 5A to 5C.

Referring to FIG. 5A, the axis of abscissa indicates the normalization frequency whose maximum frequency is 1 in the histogram of the luminance, and the axis of ordinate indicates the weighting coefficient wb based on the luminance for the luminance image. A graph 501 represents a relation between the normalization frequency of the luminance value and the weighting coefficient wb. As described hereinabove, in the background region, the luminance value is low and many pixels have luminance values of similar levels to each other. Therefore, the weighting coefficient wb is set such that, as the normalization frequency increases, the weighting coefficient wb based on the luminance value increases. In the present example, for a background candidate pixel having a luminance value that indicates a normalization frequency equal to or lower than a first frequency threshold value Thf1, the weighting coefficient wb is 0 as seen from the graph 501. Meanwhile, for a background candidate pixel having a luminance value higher than the first frequency threshold value Thf1 and equal to or lower than a second frequency threshold value Thf2, the weighting coefficient wb linearly increases in accordance with an increase of the normalization frequency. Further, for a background candidate pixel having a luminance value higher than the second frequency threshold value Thf2, the weighting coefficient wb is 1. Consequently, for a pixel included in the background region, the weighting coefficient calculation unit 23 may set the weighting coefficient wb such that the synthesis ratio of the luminance image to the emphasized contrast image is high. It is to be noted that, since the luminance value of a pixel in the background region is low in many cases, the weighting coefficient calculation unit 23 may set the normalization frequency for a luminance value equal to or higher than the given luminance threshold value (for example, one half a maximum possible value for the luminance) to 0. For example, the weighting coefficient calculation unit 23 may set the weighting coefficient wb for a pixel having such a luminance value as just described to 0.

Referring to FIG. 5B, the axis of abscissa indicates the edge strength, and the axis of ordinate indicates the weighting coefficient we for the luminance image. A graph 502 indicates a relation between the edge strength and the weighting coefficient. As described hereinabove, in the background region, the edge strength between neighboring pixels is low and many pixels have edge strengths of similar levels to each other. Therefore, the weighting coefficient we is set such that the weighting coefficient we based on the edge strength of a pixel having an edge strength lower than an edge strength Efmax at which a maximum frequency is exhibited is larger than the weighting coefficient we for a pixel having an edge strength higher than the edge strength Efmax. For example, as seen from the graph 502, for a background candidate pixel having an edge strength equal to or lower than the edge strength Efmax at which the maximum frequency is exhibited in the histogram of the edge strength, the weighting coefficient we is 1. On the other hand, for a background candidate pixel having an edge strength higher than the edge strength Efmax and equal to or lower than a value Efa obtained by multiplying the edge strength Efmax by a given coefficient (greater than 1), the weighting coefficient we linearly decreases in response to an increase of the edge strength. Then, for a background candidate pixel having an edge strength higher than the value Efa, the weighting coefficient we is 0. Consequently, the weighting coefficient calculation unit 23 may set the weighting coefficient we such that, for a pixel included in the background region, the synthesis ratio of the luminance image to the emphasized contrast image is high.

Referring to FIG. 5C, the axis of abscissa indicates a root mean square value uvdata2 $(=((u-umax)^2+(v-vmax)^2)^{1/2})$ of the difference from the color difference value (umax,vmax), which corresponds to a maximum frequency in the histogram of the color difference component (u,v), and the axis of ordinate indicates the weighting coefficient wc for the luminance image. Further, a graph 503 represents a relation between the color difference component and the weighting coefficient. As described hereinabove, the color tone does not vary very much over the entire background region. Therefore, the weighting coefficient wc is set such that, as the root mean square value uvdata2 of the differences from the color difference values (umax,vmax) corresponding to the maximum frequency of the histogram of the color difference component decreases, the weighting coefficient wc based on the color difference components increases. For example, as seen from the graph 503, for a background candidate pixel having a color difference value with regard to which the root mean square value uvdata2 of the differences from the color difference values (umax,vmax) at which the frequency is maximum in the histogram of the color difference component is equal to or lower than a given color difference threshold value Thc1, the weighting coefficient wc is 1. Meanwhile, for a background candidate pixel having a color difference value with regard to which the root mean square value uvdata2 of the differences is higher than the color difference threshold value Thc1 and besides is equal to or lower than another color difference threshold value Thc2, the weighting coefficient wc linearly decreases in response to an increase of the root mean square value uvdata2 of the differences. Further, for a background candidate pixel having a color difference value with regard to which the root mean square value uvdata2 of the differences is higher than the color difference threshold value Thc2, the weighting coefficient wc is 0. Consequently, the weighting coefficient calculation unit 23 may set the weighting coefficient wc such that, for a pixel included in the background region, the synthesis ratio of the luminance image to the emphasized contrast image is high.

The weighting coefficient calculation unit 23 calculates, for each background candidate pixel, a weighting coefficient w (=wb*we*wc) for the background candidate pixel by multiplying the weighting coefficient wb for the luminance value, the weighting coefficient we for the edge strength and the weighting coefficient wc for the color difference component. On the other hand, for a pixel that is not a background candidate pixel, the weighting coefficient calculation unit 23 sets the weighting coefficient w to 0. It is to be noted that the weighting coefficient w is an example of a synthesis ratio of the luminance image to the emphasized contrast image.

It is to be noted that, in the example described above, the weighting coefficients wb, we and wc are each represented by a value from 0 to 1. However, the weighting coefficients wb, we and wc may be each represented by a positive value within an arbitrary range, for example, within the range from 0 to 255. In this case, the weighting coefficient calculation unit 23 may calculate the weighting coefficient w by normalizing the product (wb*we*wc) of the weighting coefficients with a maximum value within the possible range for the weighting coefficient w.

The weighting coefficient calculation unit 23 outputs the weighting coefficient for each pixel to the synthesis unit 24.

The synthesis unit 24 synthesizes the luminance image and the emphasized contrast image using the weighting coefficients calculated for each pixel. For example, the synthesis unit 24 calculates (generates) a corrected luminance image by synthesizing, for each pixel, the luminance image and the emphasized contrast image in accordance with the following expression (2):

$$Pbc = w \times Po + (1-w) \times Plc \quad (2)$$

where Po is a luminance value of a noticed pixel of the luminance image, and Plc is a luminance value of a noticed pixel of the emphasized contrast image. w is a weighting coefficient calculated by the weighting coefficient calculation unit 23 for the noticed pixel. Further, Pbc is a luminance value of the noticed pixel of the corrected luminance image. It is to be noted that, if a noticed pixel is not a background candidate pixel, the synthesis unit 24 may determine the weighting coefficient w to be 0. For example, the synthesis unit 24 may determine the luminance value of the noticed pixel of the emphasized contrast image as it is as a luminance value of the noticed pixel of the corrected luminance image.

It is to be noted that, in the present embodiment, since a weighting coefficient is calculated for each pixel, the weighting coefficients of the pixels sometimes indicate a great dispersion. Therefore, in order to reduce the influence of the dispersion in weighting coefficient on the corrected luminance image, the synthesis unit 24 may perform frequency decomposition individually for the luminance image, the emphasized contrast image, the distribution of the weighting coefficient w for the luminance image and the distribution of the weighting coefficient (1−w) for the emphasized contrast image. Then, the synthesis unit 24 multiplies, for each frequency, the frequency component of the luminance image by the frequency component of the weighting coefficient for the luminance image. Similarly, the synthesis unit 24 multiplies, for each frequency, the frequency component of the emphasized contrast image by the frequency component of the weighting coefficient for the emphasized contrast image. Then, the synthesis unit 24 calculates (generates), for each frequency, a corrected luminance image by calculating an average value between the weighted frequency component of the luminance image and the weighted frequency component of the emphasized contrast image and then executing a reverse process to the frequency decomposition for the frequency component of each frequency.

It is to be noted that the synthesis unit 24 may apply Fourier transformation or Wavelet transformation as the frequency decomposition. Alternatively, the synthesis unit 24 may apply, as the frequency decomposition, a Gaussian pyramid to the distribution of the weighting coefficient in the luminance image and the distribution of the weighting coefficient in the emphasized contrast image and apply a Laplacian pyramid to the luminance image and the emphasized contrast image. In this case, the synthesis unit 24 need only to calculate (generate) a corrected luminance image by executing a reconstruction process in accordance with a Laplacian pyramid for an average value of the weighted frequency component of the luminance image and the weighted frequency component of the emphasized contrast image for each frequency.

Further, the synthesis unit 24 calculates a luminance correction coefficient r for each pixel of the corrected luminance image.

The synthesis unit 24 outputs the resulting corrected luminance image to the reverse color conversion unit 14 and outputs the luminance correction coefficient r for each pixel to the saturation correction unit 13.

Figure 6:
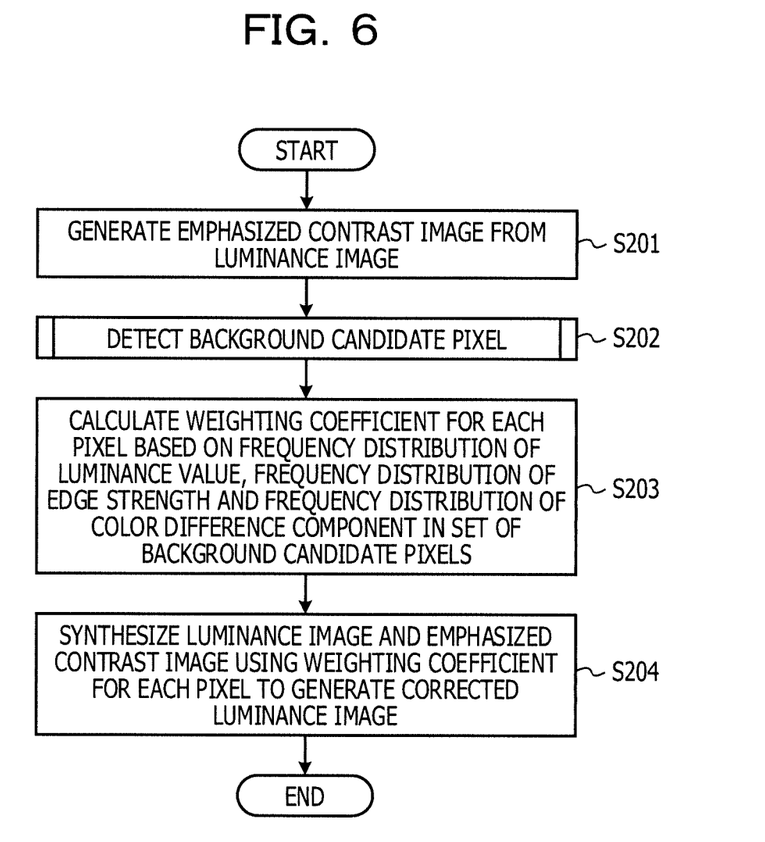
FIG. 6 is a flow chart of action for a luminance correction process.

FIG. 6 is a flow chart of action of a luminance correction process executed by a luminance correction unit. The luminance correction unit described with reference to FIG. 6 may be the luminance correction unit 12 depicted in FIG. 3.

The emphasized contrast image generation unit 21 performs a contrast emphasis process for a luminance image to generate an emphasized contrast image (step S201). After the emphasized contrast image is calculated (generated), the background candidate pixel detection unit 22 detects pixels that may possibly be included in a background region in the luminance image as background candidate pixels (step S202).

The weighting coefficient calculation unit 23 calculates, for each of the background candidate pixels, a weighting coefficient based on a relation between the respective frequency distributions of the luminance value, edge strength and color difference component and the luminance value, edge strength and color difference component of the background candidate pixel (step S203). For example, the weighting coefficient calculation unit 23 calculates the weighting coefficient wb such that, as the normalization frequency of the luminance value increases, the weighting coefficient wb based on the luminance value increases. Further, the weighting coefficient calculation unit 23 sets the weighting coefficient we such that the weighting coefficient we for a pixel having an edge strength lower than an edge strength corresponding to a maximum frequency of the edge strength is higher than the weighting coefficient we for a pixel having an edge strength higher than the edge strength corresponding to the maximum frequency. Furthermore, the weighting coefficient calculation unit 23 sets the weighting coefficient wc such that the weighting coefficient wc based on the color difference component increases as the root mean square value uvdata2 of the differences from the color difference values (umax,vmax) corresponding to the maximum frequency of the histogram of the color difference component decreases. Then, the weighting coefficient calculation unit 23 calculates a weighting coefficient w based on the product of the weighting coefficients wb, we and wc. Further, the weighting coefficient calculation unit 23 sets the weighting coefficient w to 0 for any pixel other than the background candidate pixels.

The synthesis unit 24 synthesizes the luminance image and the emphasized contrast image using the weighting coefficient calculated for each pixel to generate a corrected luminance image (step S204). Then, the luminance correction unit 12 ends the luminance correction process.

Figure 7:
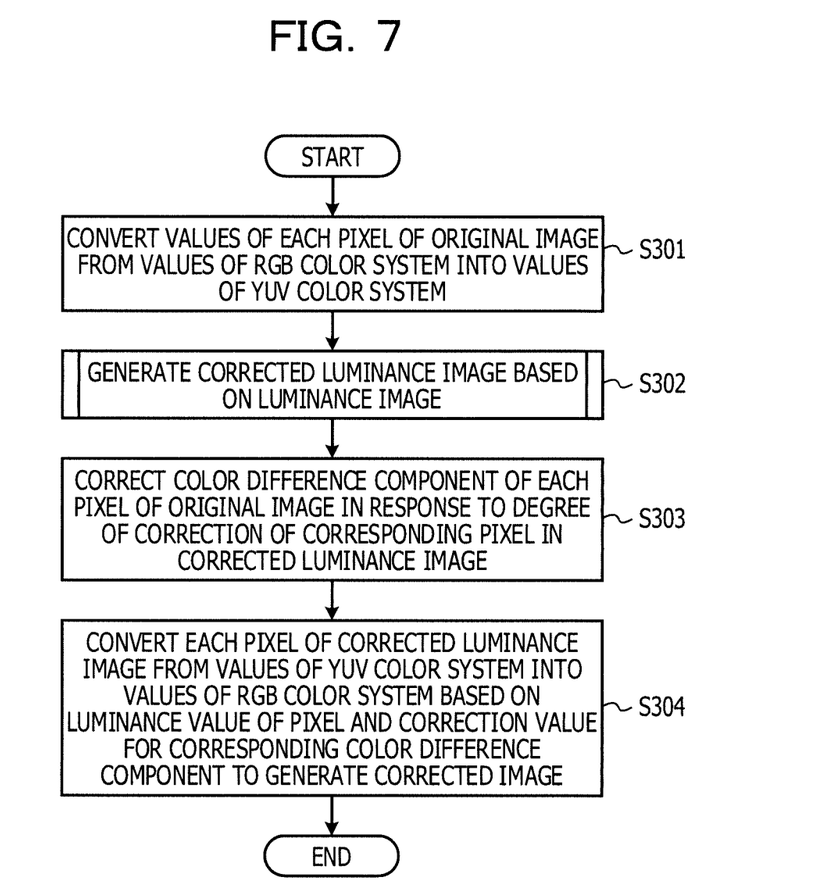
FIG. 7 is a flow chart of action for an image correction process.

FIG. 7 is a flow chart of action for an image correction process executed by a control unit. The control unit described with reference to FIG. 7 may be the control unit 6 depicted in FIG. 2.

The color conversion unit 11 converts each pixel of the luminance image from values of the RGB color system into values of the YUV color system (step S301). Then, the color conversion unit 11 outputs a luminance image representative of a luminance component of each pixel of the luminance image to the luminance correction unit 12 and outputs a color difference image representative of a color difference component of each pixel of the luminance image to the luminance correction unit 12 and the saturation correction unit 13.

The luminance correction unit 12 generates a corrected luminance image in which the contrast of an image pickup object is emphasized based on the luminance image (step S302). Further, the saturation correction unit 13 corrects the color difference components of each pixel of the color difference image in response to the degree of luminance correction in the corrected luminance image (step S303).

The reverse color conversion unit 14 converts each pixel of the corrected luminance image from values of the YUV color system represented by the luminance value of the pixel and the color difference components of a corresponding pixel of the corrected color difference image into values of the RGB color system to generate a corrected image (step S304). Then, the control unit 6 ends the image correction process.

Figure 8:
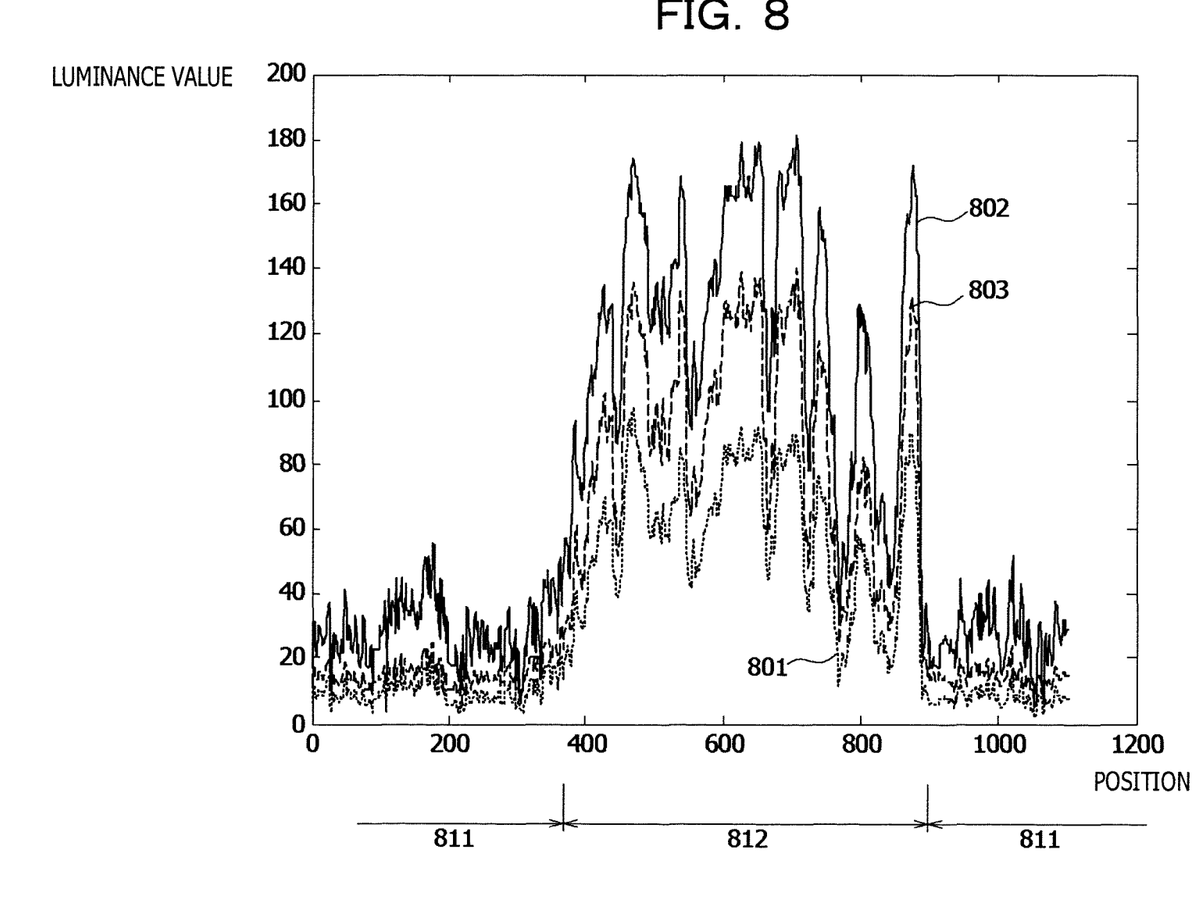
FIG. 8 is a view of comparison between a result of luminance correction according to the present embodiment and a result of luminance correction by a Retinex process as a comparative example.

FIG. 8 is a view of comparison between a result of luminance correction according to the present embodiment and a result of luminance correction by a Retinex process as a comparative example. Referring to FIG. 8, the axis of abscissa indicates the position of a pixel column on an image, and the axis of ordinate represents a luminance value. A profile 801 represents a profile of the luminance value on the pixel column on the luminance image. Meanwhile, a profile 802 represents a profile of the luminance value on the pixel column on an emphasized contrast image obtained by executing a Retinex process for the luminance image. Further, a profile 803 represents a profile of the luminance value on the pixel column on a corrected luminance image obtained by executing the image correction process according to the present embodiment for the luminance image. Further, a region 811 is a background region, and a region 812 is an image pickup object region in which an image pickup object is reflected on the image.

As indicated by the profiles 801 to 803, where the corrected luminance image obtained according to the present embodiment is compared with the emphasized contrast image, in the background region 811, the luminance value and edges between neighboring pixels are not emphasized very much and suppressed low. On the other hand, in the image pickup object region 812, edges are emphasized also in the corrected luminance image obtained according to the present embodiment although the degree of emphasis is not as high as that in the emphasized contrast image, and as a result, it may be recognized that the contrast of an image pickup object is emphasized.

As described above, the image correction apparatus generates a corrected luminance image by synthesizing an emphasized contrast image obtained from a luminance image and the luminance image with each other. Upon such synthesis, the image correction apparatus sets a weighting coefficient representative of a synthesis ratio of the luminance image to the emphasized contrast image such that a pixel having a characteristic more similar to that of a background region in terms of the frequency distribution of each of the luminance value, edge strength and color difference component has a higher weighting coefficient. Consequently, the image correction apparatus may emphasize the contrast of an image pickup object while suppressing emphasis of the luminance of the background region and noise. Further, since the image correction apparatus calculates the weighting coefficient for each pixel in such a manner as described above, even where the luminance of an image pickup object region in which an image pickup object is reflected on the luminance image is low, the weighting coefficient for each pixel included in the image pickup object region may be calculated such that the synthesis ratio of the emphasized contrast image is high. Therefore, the image correction apparatus may emphasize the contrast of an image pickup object while suppressing emphasis of the luminance of the background region and noise even where the luminance of the image pickup object region is low.

It is to be noted that, according to a modification, the background candidate pixel detection unit 22 may omit the low pass filter process for an edge strength for each pixel calculated in regard to each of a luminance image and an emphasized contrast image. For example, the background candidate pixel detection unit 22 may calculate, for each pixel of the emphasized contrast image, a difference value in edge strength by subtracting the edge strength of a corresponding pixel of the corrected luminance image from the edge strength of the pixel.

Further, since the weighting coefficient calculation unit 23 sets a weighting coefficient based on a characteristic of a background region, the detection accuracy of a background candidate pixel may not be very high. Therefore, the background candidate pixel detection unit 22 may calculate, for each pixel, an absolute value of the difference between the luminance value of the pixel in the emphasized contrast image and the luminance value of a corresponding pixel of the original image. Further, the background candidate pixel detection unit 22 may detect a pixel, with regard to which the absolute value of the difference in luminance value is equal to or higher than a given threshold value, as a background candidate pixel. Further alternatively, the background candidate pixel detection unit 22 itself may be omitted. Thus, the weighting coefficient calculation unit 23 may calculate the weighting coefficient for each pixel by executing a process similar to that in the embodiment described above for all pixels of the original image. By this, the arithmetic operation amount when background candidate pixels are detected may be reduced.

According to another modification, the weighting coefficient calculation unit 23 may calculate the weighting coefficient in such a manner as described above for one or two of the luminance value, edge strength and color difference component. For example, the weighting coefficient calculation unit 23 may calculate, for each background candidate pixel, only the weighting coefficient wb based on the luminance value and the weighting coefficient we based on the edge strength and determine the product of the weighting coefficient wb and the weighting coefficient we as a weighting coefficient w for the background candidate pixel.

Incidentally, it is sometimes desired to suppress emphasis of the contrast for a certain color of an image pickup object. For example, it is not desirable that a black suit in an original image becomes gray as a result of luminance correction. Alternatively, it is not desirable that the color of brown hair in an original image becomes a brighter color as a result of luminance correction.

Another modification is ready for such situations as described above. For example, according to the further modification, the weighting coefficient calculation unit 23 sets the weighting coefficient w for each pixel such that the weighting coefficient w for a pixel included in a range of a given color set in advance is higher than the weighting coefficient w for a pixel that is not included in the range of the color. For example, the weighting coefficient calculation unit 23 calculates, for each background candidate pixel or for all pixels, a root mean square value uvdata2 of the differences, from a reference value for a color difference component corresponding to a given color, of the color difference components of the pixel of the original image. For example, where the color whose contrast emphasis is desired to be suppressed is black, the reference value is set to (0,0). Then, the weighting coefficient calculation unit 23 sets an offset value wo for the weighting coefficient for each pixel such that, as the root mean square value uvdata2 of the differences in color difference component of the pixel decreases, the offset value wo for the weighting coefficient increases. For example, the weighting coefficient calculation unit 23 sets the offset value wo to 1 for a pixel with regard to which the root mean square value uvdata2 of the differences in color difference component is equal to or lower than a given threshold value, and sets the offset value wo to a value lower than 1 for a pixel with regard to which the root mean square value uvdata2 of the differences in color difference component is higher than the given threshold value. Thereupon, the weighting coefficient calculation unit 23 may set the offset value wo such that, as the difference between the root mean square value uvdata2 of the differences in color difference component and the given threshold value increases, the offset value wo for the weighting coefficient linearly decreases, and where the difference is equal to or larger than a given value, the offset value wo for the weighting coefficient is zero.

In this case, the weighting coefficient calculation unit 23 calculates, for each pixel, a value wt (=wb*we*wc+wo) by adding the offset value wo to a value obtained from the product of the weighting coefficient wb based on the luminance value, the weighting coefficient we based on the edge strength and the weighting coefficient we based on the color difference components. However, for any other pixel than the background candidate pixel, the weighting coefficient calculation unit 23 sets the value wt so as to satisfy wt=wo. Then, the weighting coefficient calculation unit 23 determines, for each pixel, a value obtained by normalizing the value wt with a maximum possible value wtmax for the value wt as the weighting coefficient w (=wt/wtmax).

According to this modification, the luminance correction unit 12 may suppress the effect of contrast emphasis in regard to a pixel having a certain color in an original image.

It is to be noted that the weighting coefficient calculation unit 23 may determine the offset value wo for a weighting coefficient not only from the color difference components but from a combination of them with the luminance value or the edge strength. For example, the weighting coefficient calculation unit 23 may calculate the offset value wo in such a manner as described above only for pixels whose luminance value is equal to or lower than a given value while setting the offset value wo to 0 for pixels whose luminance value is higher than the given value. Alternatively, the weighting coefficient calculation unit 23 may calculate the offset value wo in such a manner as described above only for pixels whose edge strength is equal to or lower than a given value while setting the offset value wo to 0 for pixels whose edge strength is higher than the given value.

According to a further modification, the weighting coefficient calculation unit 23 may determine a histogram of the luminance value and a histogram of the edge strength based on the luminance value and the edge strength of each pixel of an emphasized contrast image in place of utilizing the luminance value and the edge strength of each pixel of the original image. Then, the weighting coefficient calculation unit 23 may calculate the weighting coefficient wb for a luminance value and the weighting coefficient we for an edge strength in such a manner as described in the above embodiment from the histogram of the luminance value and the histogram of the edge strength determined based on the emphasized contrast image. Further, the weighting coefficient calculation unit 23 may calculate a histogram of the color difference components based on the color difference components of a corrected saturation image generated once by calculating the luminance correction coefficient r for each pixel from the emphasized contrast image. Then, the weighting coefficient calculation unit 23 may calculate the weighting coefficient we based on the color difference components of each background candidate pixel based on the histogram of the color difference components.

Alternatively, the weighting coefficient calculation unit 23 may execute a smoothing process such as a Gaussian filter process for the weighting coefficient w for each pixel. By this, the influence of the difference in weighting coefficient between neighboring pixels on the corrected luminance image is reduced.

According to a still further modification, the control unit 6 may execute the process of the luminance correction unit 12 for each of a red component, a blue component and a green component of an inputted image. Further alternatively, an image inputted to the control unit 6 may be a monochromatic image having only a luminance component. In those cases, the color conversion unit 11, the saturation correction unit 13 and the reverse color conversion unit 14 may be omitted. Alternatively, the color conversion unit 11 may convert, for each pixel of an original image, pixel values of the pixel into values represented by a color system other than the YUV color system such as the L*a*b* color system. In this case, also the reverse color conversion unit 14 may convert values of each pixel from values of a color system converted by the color conversion unit 11 into values of the RGB color system. Further alternatively, where the values of each pixel of a corrected image may be represented by a color system other than the RGB color system, the reverse color conversion unit 14 may be omitted.

The functions of the components of the image correction apparatus according to the embodiment or any modification to the embodiment described above may be implemented by a computer program executed by a processor. Such a computer program as just described may be provided in the form recorded on a computer-readable recording medium such as a magnetic recording medium or an optical recording medium. It is to be noted that the recording medium in this case does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus for image correction, the apparatus comprising:
    a memory; and
    a processor coupled to the memory and configured to
        execute a second image generation process that includes execution of a process for emphasizing a contrast for a first image to generate a second image,
        execute a ratio calculation process that includes calculation, based on a relation between a frequency distribution of at least one of a luminance value, an edge strength and a color component in the first image or the second image and a value of the at least one for each pixel, of a synthesis ratio of the first image to the second image for the pixel,
        execute a synthesis process that includes synthesis of the first image and the second image based on the synthesis ratio for each pixel, and
        execute a pixel detection process that includes detection of a background candidate pixel, which may possibly be included in a background region of the first image, based on a difference in luminance value or a difference in edge strength for each pixel between the first image and the second image,
    wherein the ratio calculation process includes calculation of a frequency distribution of the at least one of the luminance value, edge strength and color component from a set of the background candidate pixels.

2. The apparatus according to claim 1,
    wherein the ratio calculation process includes calculation of the synthesis ratio for each pixel such that a pixel having a characteristic closer to a characteristic of a background region of the first image in terms of the at least one of the luminance value, edge strength and color component has a higher synthesis ratio of the first image to the second image.

3. The apparatus according to claim 2
    wherein the ratio calculation process includes
        calculation of a histogram representative of a frequency distribution of the luminance value in the first image or the second image, and
        calculation of the synthesis ratio for each pixel such that a luminance value having a higher frequency in the histogram has a higher synthesis ratio of the first image to the second image in regard to the pixel that has the luminance value.

4. The apparatus according to claim 2,
    wherein the ratio calculation process includes
        calculation of a histogram representative of a frequency distribution of the edge strength in the first image or the second image, and
        calculation of the synthesis ratio for each pixel such that the synthesis ratio of the first image to the second image for a pixel having an edge strength lower than an edge strength with which a maximum frequency is exhibited in the histogram is higher than the synthesis ratio of the first image to the second image for a pixel having an edge strength higher than the edge strength with which the maximum frequency is exhibited.

5. The apparatus according to claim 2,
    wherein the ratio calculation process includes
        calculation of a histogram representative of a frequency distribution of the color component in the first image or the second image, and
        calculation of the synthesis ratio for each pixel such that a color component shorter in distance to a color component with which a maximum frequency is exhibited in the histogram has a higher synthesis ratio of the first image to the second image for the pixel having the color component.

6. The apparatus according to claim 1,
    wherein the ratio calculation process includes
        calculation of the synthesis ratio for each pixel such that the synthesis ratio of the first image to the second image for a pixel having a color component included in a given range of color is higher than the synthesis ratio of the first image to the second image for a pixel having a color component that is not included in the range.

7. A method, performed by a computer for image correction, the method comprising:
    executing, by a processor of the computer, a second image generation process that includes execution of a process for emphasizing a contrast for a first image to generate a second image;
    executing, by the processor of the computer, a ratio calculation process that includes calculation, based on a relation between a frequency distribution of at least one of a luminance value, an edge strength and a color component in the first image or the second image and a value of the at least one for each pixel, of a synthesis ratio of the first image to the second image for the pixel;
    executing, by the processor of the computer, a synthesis process that includes synthesis of the first image and the second image based on the synthesis ratio for each pixel; and
    executing a pixel detection process that includes detection of a background candidate pixel, which may possibly be included in a background region of the first image, based on a difference in luminance value or a difference in edge strength for each pixel between the first image and the second image,
    wherein the ratio calculation process includes calculation of a frequency distribution of the at least one of the luminance value, edge strength and color component from a set of the background candidate pixels.

8. A non-transitory computer-readable storage medium storing a program for image correction that causes a computer to execute a process, the process comprising:
    executing a second image generation process that includes execution of a process for emphasizing a contrast for a first image to generate a second image;
    executing a ratio calculation process that includes calculation, based on a relation between a frequency distribution of at least one of a luminance value, an edge strength and a color component in the first image or the second image and a value of the at least one for each pixel, of a synthesis ratio of the first image to the second image for the pixel;

executing a synthesis process that includes synthesis of the first image and the second image based on the synthesis ratio for each pixel; and executing a pixel detection process that includes detection of a background candidate pixel, which may possibly be included in a background region of the first image, based on a difference in luminance value or a difference in edge strength for each pixel between the first image and the second image, wherein the ratio calculation process includes calculation of a frequency distribution of the at least one of the luminance value, edge strength and color component from a set of the background candidate pixels.

\* \* \* \* \*